United States Patent
Nishiyama et al.

(10) Patent No.: US 9,036,306 B1
(45) Date of Patent: May 19, 2015

(54) GROUNDING FOR A HARD DISK DRIVE SUSPENSION TAIL

(71) Applicant: HGST Netherlands B.V., Amsterdam (NL)

(72) Inventors: Nobumasa Nishiyama, Yokohama (JP); Yuji Soga, Ashigarakamigun (JP); Kazuhiro Nagaoka, Fujisawa (JP); John Contreras, Palo Alto, CA (US); Albert Wallash, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/135,222

(22) Filed: Dec. 19, 2013

(51) Int. Cl.
    G11B 5/48 (2006.01)

(52) U.S. Cl.
    CPC .............. *G11B 5/486* (2013.01); *G11B 5/4853* (2013.01)

(58) Field of Classification Search
    USPC .................................. 360/245.8, 245.9, 264.2
    See application file for complete search history.

(56) References Cited

U.S. PATENT DOCUMENTS

| | | | | |
|---|---|---|---|---|
| 4,645,280 A | * | 2/1987 | Gordon et al. | 439/77 |
| 5,095,396 A | * | 3/1992 | Putnam et al. | 360/264.2 |
| 5,103,359 A | * | 4/1992 | Marazzo | 360/264.2 |
| 5,122,703 A | * | 6/1992 | Takahashi et al. | 310/36 |
| 5,241,454 A | * | 8/1993 | Ameen et al. | 361/744 |
| 5,644,452 A | * | 7/1997 | Cox et al. | 360/264.2 |
| 5,677,815 A | * | 10/1997 | Chan | 360/265.7 |
| 5,838,519 A | * | 11/1998 | Takizawa et al. | 360/245.9 |
| 5,844,754 A | * | 12/1998 | Stefansky et al. | 360/266.1 |
| 5,953,183 A | * | 9/1999 | Butler et al. | 360/264.2 |
| 6,204,998 B1 | * | 3/2001 | Katz | 360/123.36 |
| 6,256,170 B1 | * | 7/2001 | Honda | 360/234.5 |
| 6,765,763 B2 | * | 7/2004 | SeeToh et al. | 360/264.2 |
| 6,775,104 B2 | * | 8/2004 | Hong et al. | 360/244.1 |
| 7,158,350 B1 | * | 1/2007 | Carlson et al. | 360/266.3 |
| 7,227,725 B1 | * | 6/2007 | Chang et al. | 360/264.2 |
| 7,355,818 B2 | * | 4/2008 | McReynolds et al. | 360/264.2 |
| 7,466,519 B2 | * | 12/2008 | Wakaki et al. | 360/245.9 |
| 7,538,981 B1 | | 5/2009 | Pan | |
| 8,014,107 B2 | * | 9/2011 | Toukairin et al. | 360/245.9 |
| 8,018,688 B2 | * | 9/2011 | Kamigama et al. | 360/266 |
| 8,068,314 B1 | | 11/2011 | Pan et al. | |
| 8,089,730 B1 | | 1/2012 | Pan et al. | |
| 8,320,084 B1 | | 11/2012 | Shum et al. | |
| 8,339,743 B2 | * | 12/2012 | Miura et al. | 360/244.3 |
| 8,472,145 B2 | * | 6/2013 | Ho et al. | 360/264.2 |
| 8,570,688 B1 | * | 10/2013 | Hahn et al. | 360/294.4 |
| 8,737,021 B2 | * | 5/2014 | Yonekura et al. | 360/245.9 |
| 2006/0119987 A1 | * | 6/2006 | Wong et al. | 360/264.2 |
| 2009/0244782 A1 | * | 10/2009 | Kagawa | 360/245.8 |
| 2011/0090599 A1 | | 4/2011 | Feng et al. | |

* cited by examiner

*Primary Examiner* — Brian Miller
(74) *Attorney, Agent, or Firm* — John D. Henkhaus

(57) ABSTRACT

A flexible cable assembly (FCA) has a stiffener layer positioned in electrical contact with an electrical ground feature of the FCA, and a head stack assembly (HSA) may include a suspension tail electrically connected to the stiffener layer of the FCA, thus providing a robust ground path between the read/write head and the arm or E-block of the HSA. Additional efficient grounding techniques may include directly electrically connecting the suspension tail to the arm via a conductive adhesive, directly electrically connecting the FCA stiffener layer to the arm via a conductive screw, and/or directly electrically connecting the ground feature and the stiffener layer of the FCA to the arm using a ground post or screw.

21 Claims, 8 Drawing Sheets

GROUNDING FOR A HARD DISK DRIVE SUSPENSION TAIL

FIELD OF EMBODIMENTS OF THE INVENTION

Embodiments of the invention relate generally to hard disk drives and more particularly to grounding techniques for a suspension tail.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil; which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

An HDD includes at least one head gimbal assembly (HGA) that generally includes a slider that houses the head, and a suspension. Each slider is attached to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension of a conventional disk drive typically includes a relatively stiff load beam with a mount plate at the base end, which subsequently attaches to the actuator arm, and whose free end mounts a flexure that carries the slider and its head.

The flexure in an integrated lead suspension is generally made out of a laminated multilayer material. Typically, it consists of a support layer (e.g., stainless steel "SST"), a dielectric insulating layer (e.g., polyimide), a conductor layer (e.g., copper), and a cover layer (e.g., polyimide) that insulates the conductor layer. The electrical lead lines are etched into the conductor layer, while the polyimide layer serves as the insulator from the underlying SST support layer. The SST support layer is also patterned to provide strength and gimbaling characteristics to the flexure. The conducting leads, called traces, electrically connect the head transducer to the read/write electronics. These traces are often routed on both sides of the suspension, especially in the gimbal region, and then along a suspension tail terminating at a connection with a flexible printed circuit (FPC) of a flexible cable assembly (FCA), with which the read/write electronics are coupled.

Typically, the suspension is fixed to the actuator arm by swaging and the suspension ground (GND) is connected with the actuator by way of this swaging. Because the swaging of the suspension is fixed at the arm actuator, there is a resonance node in the vicinity of the swaging. Furthermore, because the SST portion at the tip end of the suspension tail is not mechanically connected to anything, an electrical resonance mode exists in which the tail tip of the suspension constitutes the antinode of the resonance. For example, a quarter-wavelength resonance mode may be present with certain configurations. Because the suspension tail tip is not connected with GND, this is the electrical resonance mode of the SST portion of the suspension tail. This electrical resonance can introduce noise into the read path and/or may cause transmission line conversion from a common mode signal to a differential mode signal due to the unbalance.

The read inputs of the preamp need to receive a stable read signal that is minimally affected by interference, such as that which may be introduced by the electrical resonance mode associated with the suspension tail. Furthermore, as the number of conductors of the FCA increases, the GND pattern on the FCA has to be made narrower and, consequently, the impedance of the GND pattern increases. Therefore, the beneficial effect of grounding is diminished, even if the GND pad at the suspension tail tip is connected with the GND pad of the FCA. Consequently, a resonance mode is produced with an even longer electrical length, and the SER (symbol error rate) of the system is degraded by pickup of this resonance. Thus, reducing the electrical resonance is desirable.

SUMMARY OF EMBODIMENTS

Embodiments of the invention are directed at a flexible cable assembly (FCA) having a stiffener layer positioned in electrical contact with an electrical ground feature of the FCA, a head stack assembly (HSA) of a hard disk drive (HDD) comprising such an FCA, and an HDD comprising such an HSA. Embodiments of such an FCA may comprise a ground post protruding from the stiffener layer through an insulation layer to contact an upper FCA ground feature, or may comprise a low-resistance material sandwiched between the stiffener layer and the FCA ground feature.

Embodiments of an HSA may comprise a suspension tail having a ground trace electrically connected to the stiffener layer of the FCA, thus providing a ground path between the read/write head and the FCA, which may in turn be electrically connected to an actuator arm or E-block of the HSA. Additional features or embodiments providing robust, efficient grounding techniques may include directly electrically connecting the suspension tail to the arm via a conductive adhesive, directly electrically connecting the FCA stiffener layer to the arm via a conductive screw, and/or directly electrically connecting the ground feature and the stiffener layer of the FCA to the arm using a ground post or screw.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a flexible cable assembly (FCA) having a metal stiffener layer positioned in contact with an electrical ground feature of the FCA, and a head stack assembly which may comprise a suspension tail having a ground trace electrically connected to the stiffener layer of the FCA, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
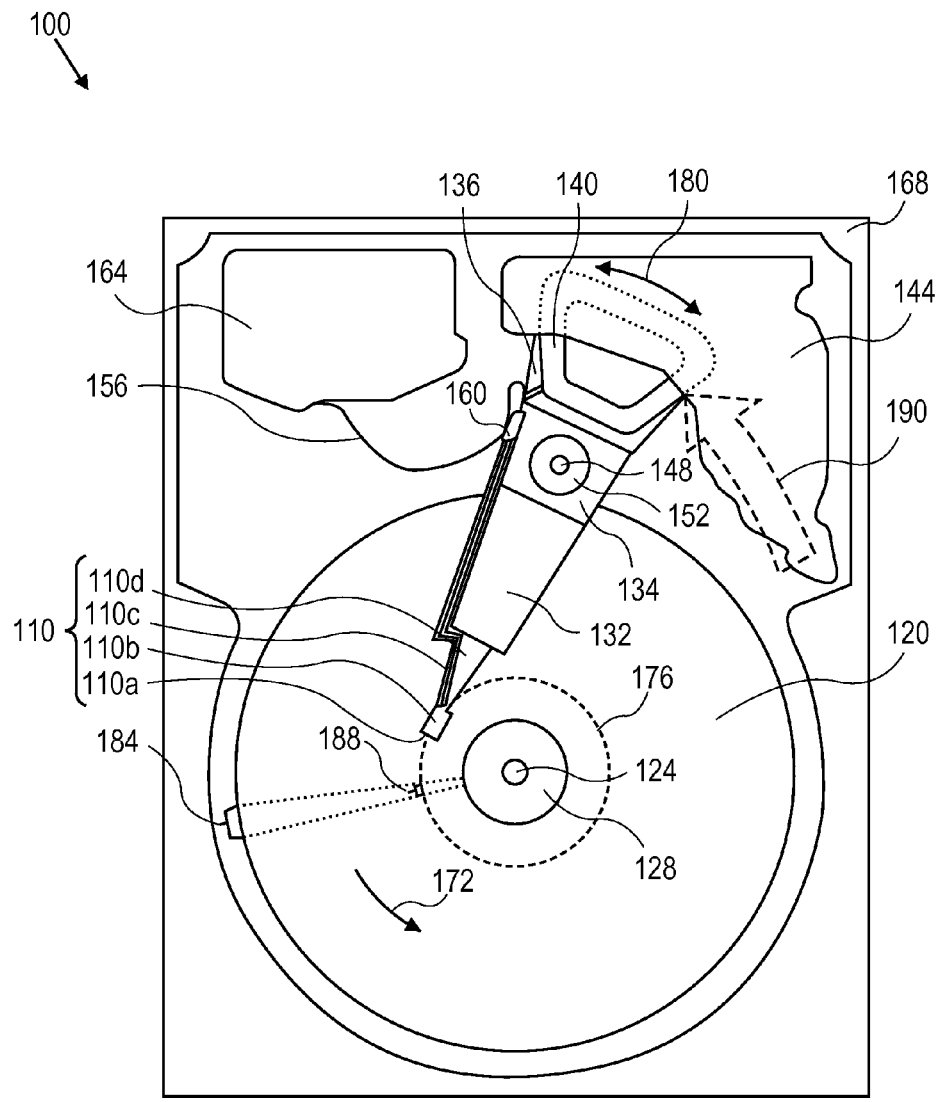
FIG. 1 is a plan view illustrating a hard disk drive (HDD), according to an embodiment of the invention.

Embodiments of the invention may be used in the context of a head stack assembly of a hard disk drive, for example. Thus, in accordance with an embodiment, a plan view illustrating an HDD 100 is shown in FIG. 1. FIG. 1 illustrates the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider, and a load beam 110*d* attached to the lead suspension 110*c*. The HDD 100 also includes at least one magnetic-recording media 120 rotatably mounted on a spindle 124 and a drive motor attached to the spindle 124 for rotating the media 120. The head 110*a* includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet. The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a suspension flexure to which the head slider is coupled, an actuator arm (e.g., arm 132) to which the suspension is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components, such as a suspension tail. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110*a*, are provided by a flexible interconnect cable 156 ("flex cable"). Interconnection between the flex cable 156 and the head 110*a* may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110*b* rides so that the slider 110*b* flies above the surface of the media 120 without making contact with a thin magnetic-recording medium in which information is recorded.

The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Introduction

As mentioned, the suspension GND typically has been constructed by fixing the suspension to the arm actuator by swaging and thereby connecting the suspension GND with the actuator by way of this swaging, whereby the suspension GND and the FCA GND were connected through the actuator. Alternatively, a GND feature on the FCA has been provided, which is then connected with a preamp GND and connected to the actuator by means of a screw. However, because the swaging of the suspension is fixed at the arm actuator, there is a resonance node in the vicinity of the swaging, and because the SST portion at the tip end of the suspension tail is not connected to anything else and not connected with GND, an electrical resonance mode such as a quarter-wavelength electrical resonance mode exists. Consequently, noise may be introduced into the read path.

Therefore, reducing the electrical resonance is desirable and one way in which to reduce the resonance is to improve the grounding performance of the head stack assembly (HSA). Ways in which to improve the grounding performance of the HSA include improving the ground path from the suspension to the flexible cable assembly (FCA), and improving the performance of the GND feature of the FCA such as by lowering the GND path impedance from the FCA GND feature to the actuator.

With reference to FIG. 1, recall that in an HDD 100 an arm 132 is attached to the HGA 110 and to the carriage 134, which is attached to the armature 136 of the voice coil motor. In the case of an HDD having multiple disks, the carriage 134 is called an "E-block". With a common fabrication approach, a single integrated part is composed of the armature 136, the carriage 134, and the arm 132. In the context of a head stack assembly (HSA), the arm is the most stable GND and it is the fundamental GND of the E-block. Therefore, robust and efficient ground paths to the arm 132 provide quality grounding.

Flexible Cable Assembly Ground Path

Figure 2A:
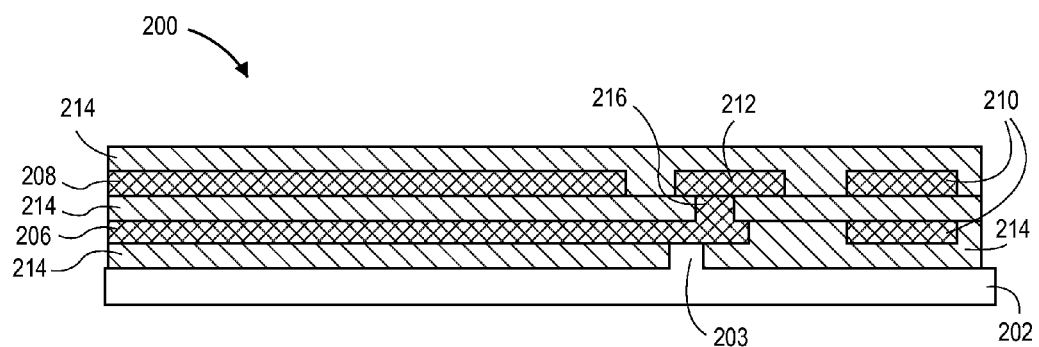
FIG. 2A is a cross-sectional side view illustrating a flexible cable assembly (FCA), according to an embodiment of the invention.

FIG. 2A is a cross-sectional side view illustrating a flexible cable assembly (FCA), according to an embodiment of the invention. FCA 200 is a layered structure comprising a stiffener 202, with which one or more layers of electrical leads (i.e., "traces") and insulation layers are coupled. For a non-limiting example, a bottom layer ground (GND) trace 206, a top layer signal trace 208 and a plurality of signal traces 210, with generally alternating or adjacent insulation layers 214, are configured as layers on stiffener layer 202. Stiffener layer 202 is typically formed of metal and, according to an embodiment, is formed of aluminum. With an HSA structure, the stiffener layer 202 contacts the E-Block.

Continuing with the example layout of FCA 200, trace 212 may be configured as a signal trace or, according to an embodiment, configured as a GND trace. In the case in which trace 212 is a GND trace, FCA 200 may comprise a via 216 electrically connecting GND trace 212 with GND trace 206, where a via is an electrical connection between layers in an electronic circuit and which goes through the plane of one or more adjacent layers. In the case in which trace 212 is a signal trace, the via 216 need not be present, rather that area would be part of the insulation layer 214. According to an embodiment, ground feature 203 provides an electrically conductive path to the electrical ground, i.e., from stiffener layer 202 to the GND trace 206 through the adjacent insulation layer 214. In this way, the high impedance of the wiring of the FCA GND pattern can be reduced by substituting that of the stiffener layer 202, which is of relatively thick cross-section.

Figure 2B:
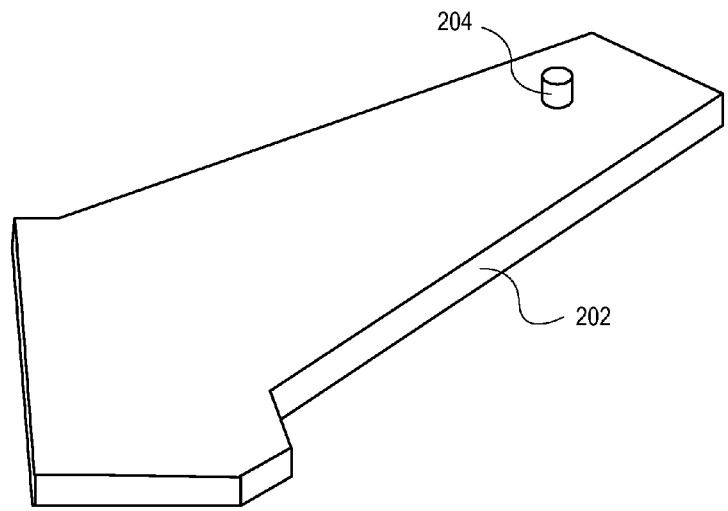
FIG. 2B is a perspective view illustrating a stiffener layer of the FCA of FIG. 2A, according to an embodiment of the invention.

FIG. 2B is a perspective view illustrating a stiffener layer of the FCA of FIG. 2A, according to an embodiment of the invention. According to an embodiment, ground feature 203 comprises a conductive ground post 204 protruding from the stiffener layer 202 and which, when assembled with the trace and insulation layers of FIG. 2A, protrudes through the adjacent insulation layer 214 and into electrical contact (and possibly physical contact) with the GND trace 206. In this embodiment, ground post 204 terminates at and does not protrude through the GND trace 206 or beyond. Ground post 204 may be fabricated, for a non-limiting example, by etching from a larger piece of metal constituting stiffener layer 202, cleaning to reduce the contact resistance, and then roughened for better contact potential. The ground post 204 may be pushed into the protrusion-receiving hole of insulation layer 214, which may be filled with conductive oil, thereby pushing this oil out. Thus, the contact resistance of the ground post 204 at this face is further lowered. Ground post 204 is depicted in FIG. 2B as cylindrical but it need not be that shape. For example, ground post 204 may be rectangular-shaped or square-shaped, or any other suitable shape that provides sufficient stable contact with the GND trace 206.

Figure 5:
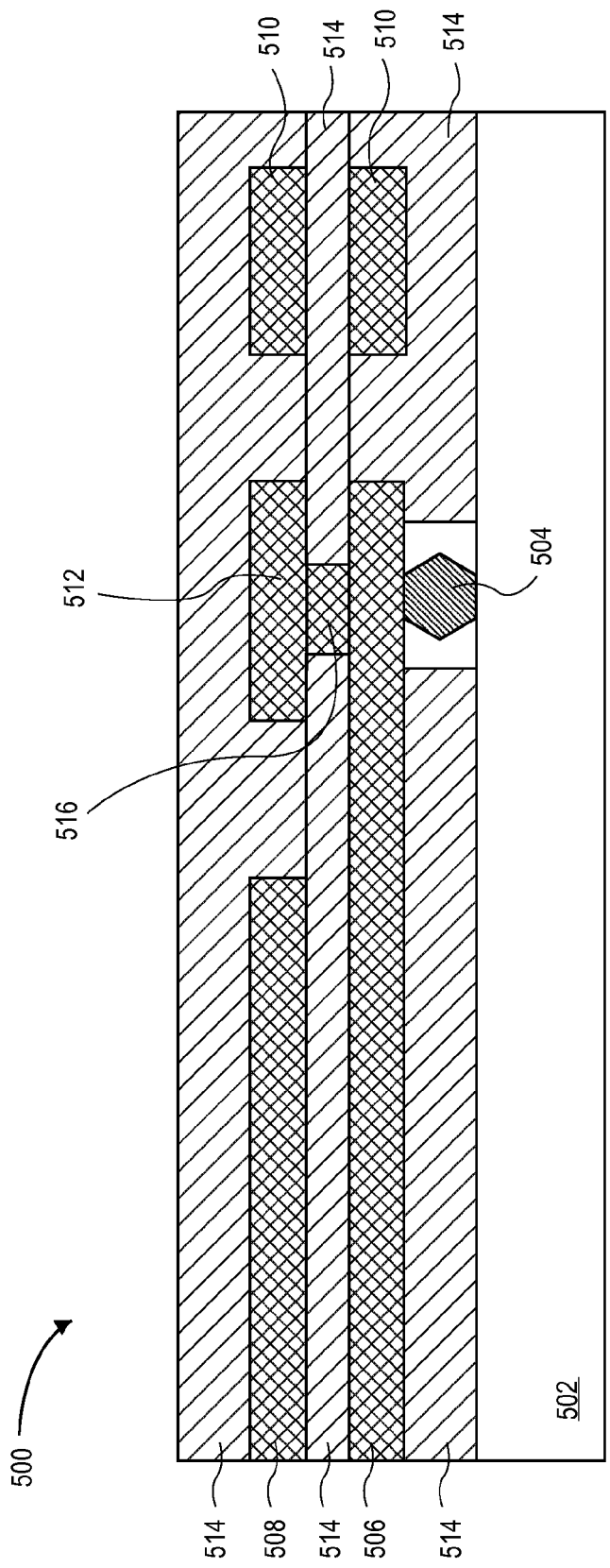
FIG. 5 is a cross-sectional side view illustrating an FCA, according to an embodiment of the invention.

Alternatively, ground feature 203 may comprise a low-resistance material sandwiched between the stiffener layer 202 and the GND trace 206, as depicted in FIG. 5. FIG. 5 is a cross-sectional side view illustrating an FCA, according to an embodiment of the invention. Similarly to FCA 200, FCA 500 is a layered structure comprising a stiffener 502, with which one or more layers of traces and insulation layers are coupled. For a non-limiting example, a bottom layer ground (GND) trace 506, a top layer signal trace 508 and a plurality of signal traces 510, with generally alternating or adjacent insulation layers 514, are configured on stiffener layer 502. Stiffener layer 502 is formed of metal, typically aluminum. Continuing with the example layout of FCA 500, trace 512 may be configured as a signal trace or, according to an embodiment, configured as a GND trace. In the case in which trace 512 is a GND trace, FCA 500 comprises a via 516 electrically connecting GND trace 512 with GND trace 506. Low-resistance material 504 provides an electrically conductive path to the electrical ground, i.e., from stiffener layer 502 to the GND trace 506 through the adjacent insulation layer 514. In the case in which a via 516 is used to electrically connect GND trace 506 with GND trace 512, an electrical path is provided from stiffener layer 502 to the GND trace 506 through the adjacent insulation layer 514 via the low-resistance material 504 and continuing on to GND trace 512 by way of the via 516. According to one embodiment, low-resistance material 504 comprises an electrically-conductive oil. According to another embodiment, low-resistance material 504 comprises solder.

Suspension Tail to Flexible Cable Assembly Ground Path

Figure 3:
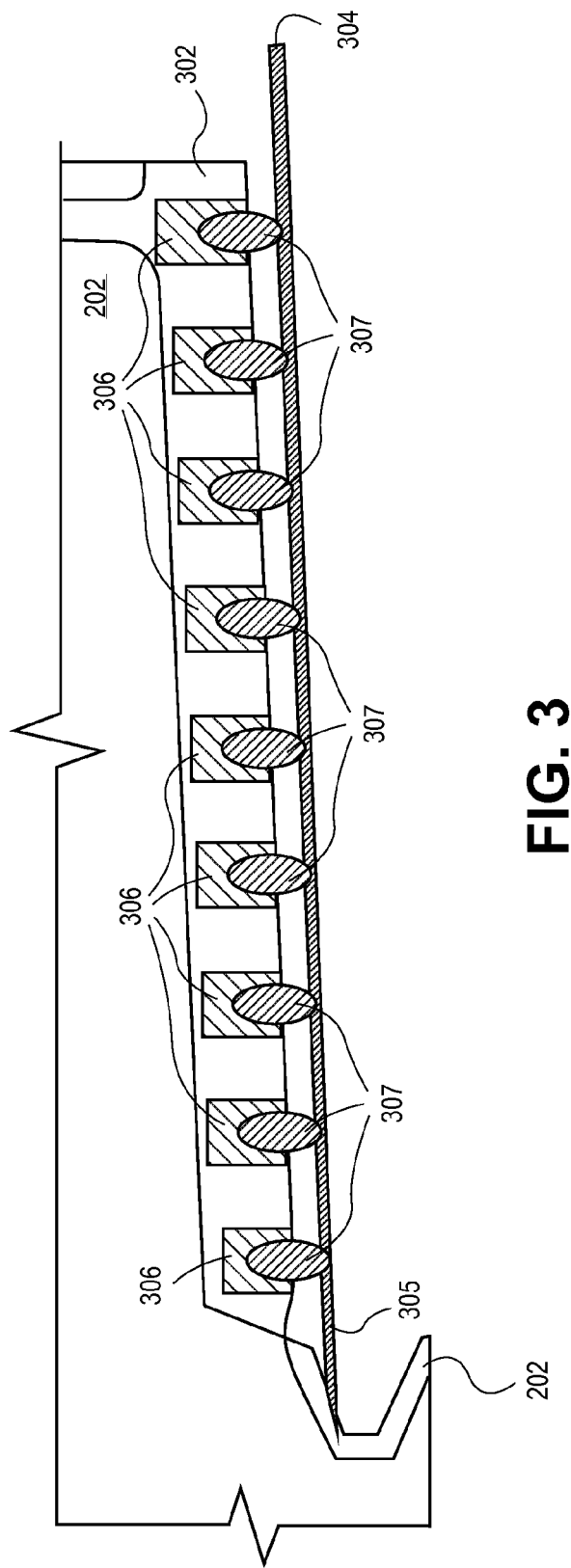
FIG. 3 is a plan view illustrating an FCA-suspension tail interface, according to an embodiment of the invention.

FIG. 3 is a plan view illustrating an FCA-suspension tail interface, according to an embodiment of the invention. The interface, or assembly, of FIG. 3 comprises a flexible cable assembly (FCA) 302 having a stiffener layer 202, in physical and electrical contact with a suspension tail 304 having a tail tip 305. According to an embodiment, the stiffener layer 202 is formed of aluminum and the suspension tail is formed of stainless steel. It is the suspension tail tip that, in prior configurations, was cantilevered and not connected with GND, which introduced a quarter-wavelength electrical resonance mode thereby introducing noise into the read path. However, because the tail tip 305 of suspension tail 304 is now in contact with the stiffener layer 202 of FCA 302, an electrically conductive path for the suspension GND is formed.

Normally, stainless steel and aluminum cannot be connected by use of solder. However, the FCA 302 includes a plurality of solder pads 306, with which a plurality of respective solder elements 307 are used to electrically (and mechanically) connect the suspension tail 304 to the FCA 302. The solder provides a "pulling" force between FCA 302 and suspension tail 304, thereby forcing together into contact the stainless steel area of the tail tip 305 with the aluminum stiffener layer 202 of FCA 302. Such contact provides an electrically conductive path for the suspension GND to the stiffener layer 202 and to the corresponding ground feature 203 (FIG. 2A) and GND trace 206 (FIG. 2A) of the FCA 302 (see, e.g., FCA 200 of FIG. 2A).

Further, and according to an embodiment, a GND pad on the suspension tail 304 may be connected to a GND solder pad (e.g., a solder pad 306) of the FCA 302. Therefore, the suspension tail 304 GND connects to the FCA 302 GND and to the stiffener layer 202 (and thus ultimately to the E-Block), a configuration which may remove the quarter wavelength resonance phenomenon Ground Path to Arm With reference to FIG. 1, recall that in an HDD 100 an arm 132 is attached to the HGA 110 and to the carriage 134, which is attached to the armature 136 of the voice coil motor. In the case of an HDD having multiple disks, the carriage 134 is called an "E-block". With a common fabrication approach, a single integrated part is composed of the armature 136, the carriage 134, and the arm 132. In the context of a head stack assembly (HSA), the arm is the most stable GND and it is the fundamental GND of the E-block. Therefore, robust and efficient ground paths to the arm 132 provide quality grounding.

Figure 4:
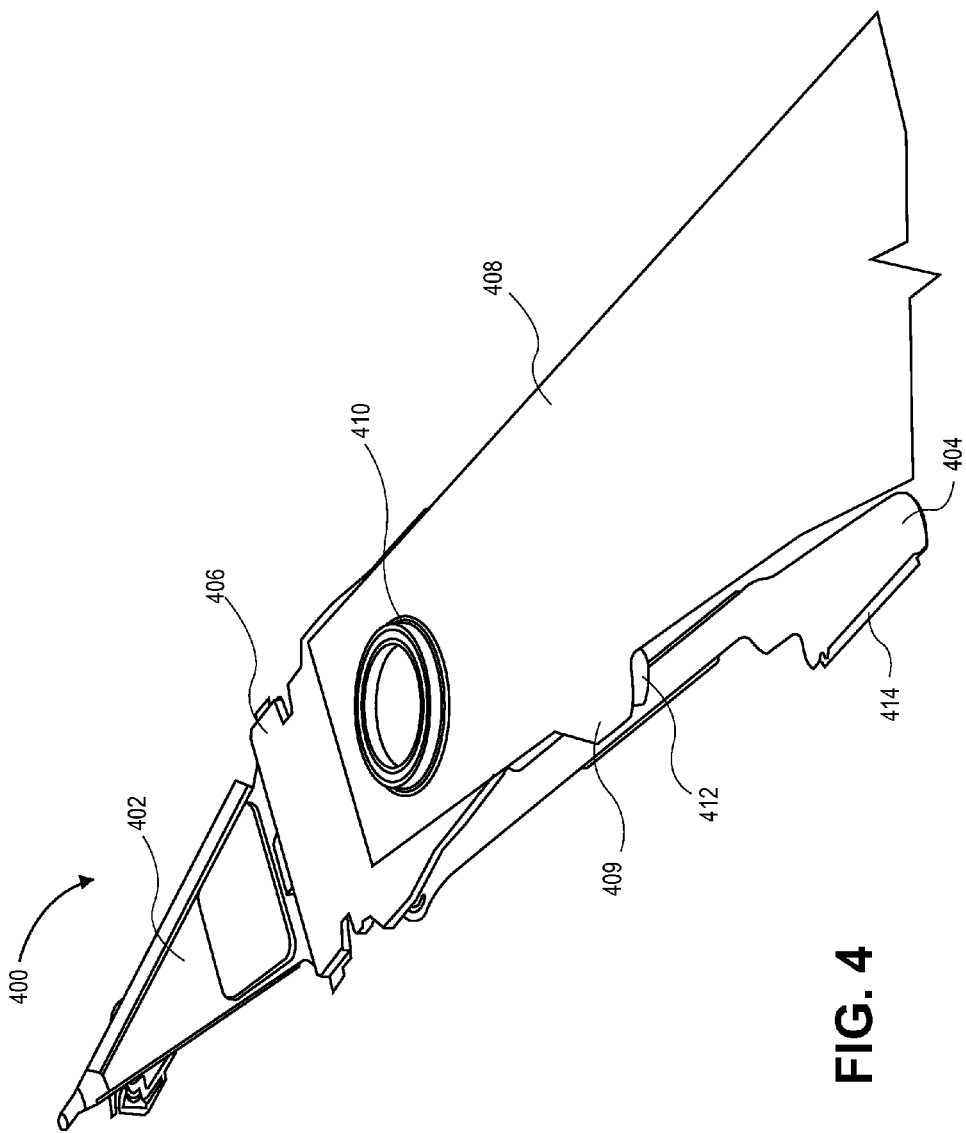
FIG. 4 is a perspective view illustrating part of a head stack assembly (HSA), according to an embodiment of the invention.

FIG. 4 is a perspective view illustrating part of a head stack assembly (HSA), according to an embodiment of the invention. HSA 400 comprises a suspension 402 having a suspension tail 404, coupled with a mount plate 406, coupled with an arm 408 by way of a swage 410. In this embodiment, arm 408 includes an arm tab 409. An electrically conductive path between the suspension tail 404 and the arm 408 is provided using a conductive adhesive 412 (e.g., a conductive glue) between the arm tab 409 and the suspension tail 404. With this configuration, the quarter-wavelength electrical resonance mode is affected (i.e., effectively reduced) by reducing the wavelength of the resonance, which increases the frequency and thereby reduces the level of interference with the read signal.

Figure 6:
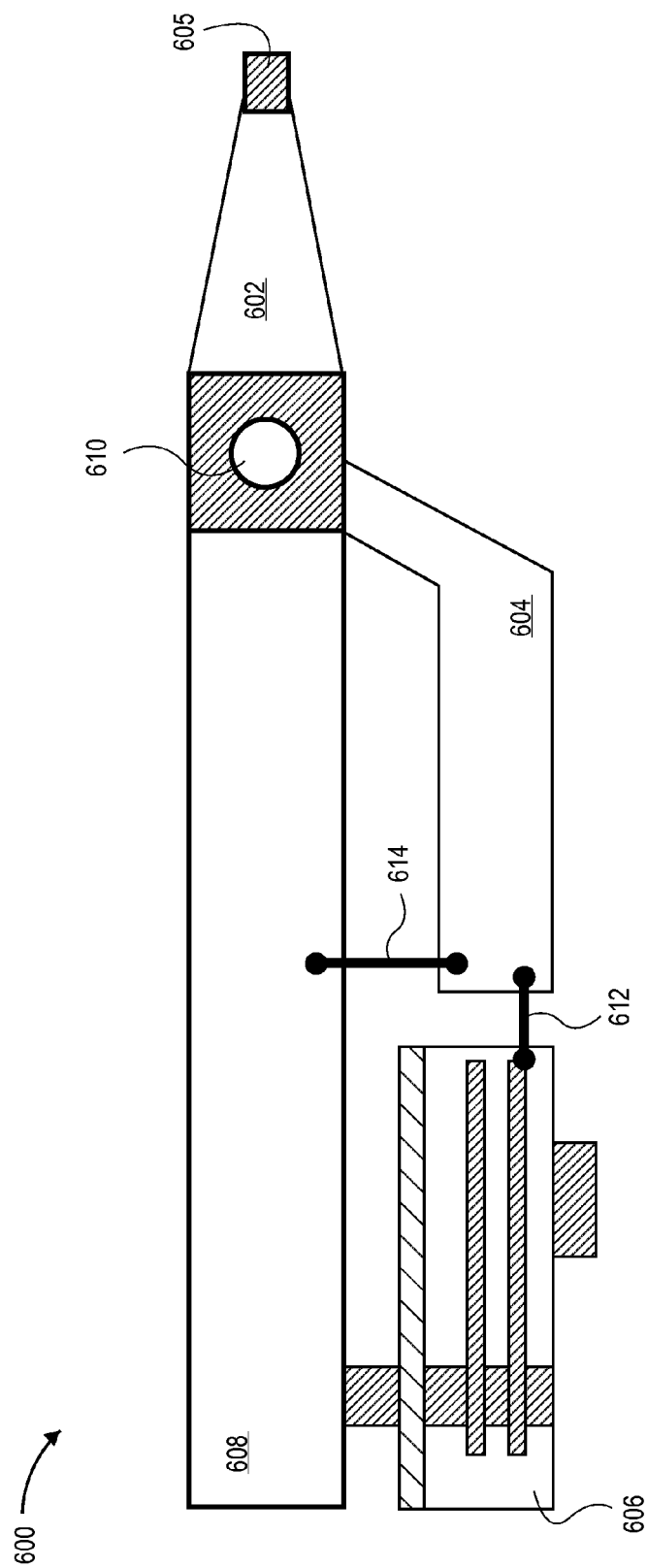
FIG. 6 is a diagram illustrating a grounding configuration of an HSA, according to an embodiment of the invention.

FIG. 6 is a diagram illustrating a grounding configuration of an HSA, according to an embodiment of the invention. The embodiment depicted in FIG. 6 illustrates that previously described embodiments may be combined, although such combinations are not limited to that depicted in FIG. 6. HSA 600 comprises a suspension 602 coupled with a head 605 and having a suspension tail 604, coupled with an arm 608 by way of a swage 610. An electrically conductive path 612 between the suspension tail 604 and the FCA 606 is provided, such as with embodiments described in reference to FIG. 3. Further, an electrically conductive path 614 between the suspension tail 604 and the arm 608 is provided, such as by using a conductive adhesive between the arm 608 and the suspension tail 604, similar to the embodiments described in reference to FIG. 4. According to an embodiment, the position of the conductive adhesive electrically connecting the arm 608 and the suspension tail 604 is at the suspension tail tip (see, e.g., tail tip 305 of FIG. 3).

Figure 7:
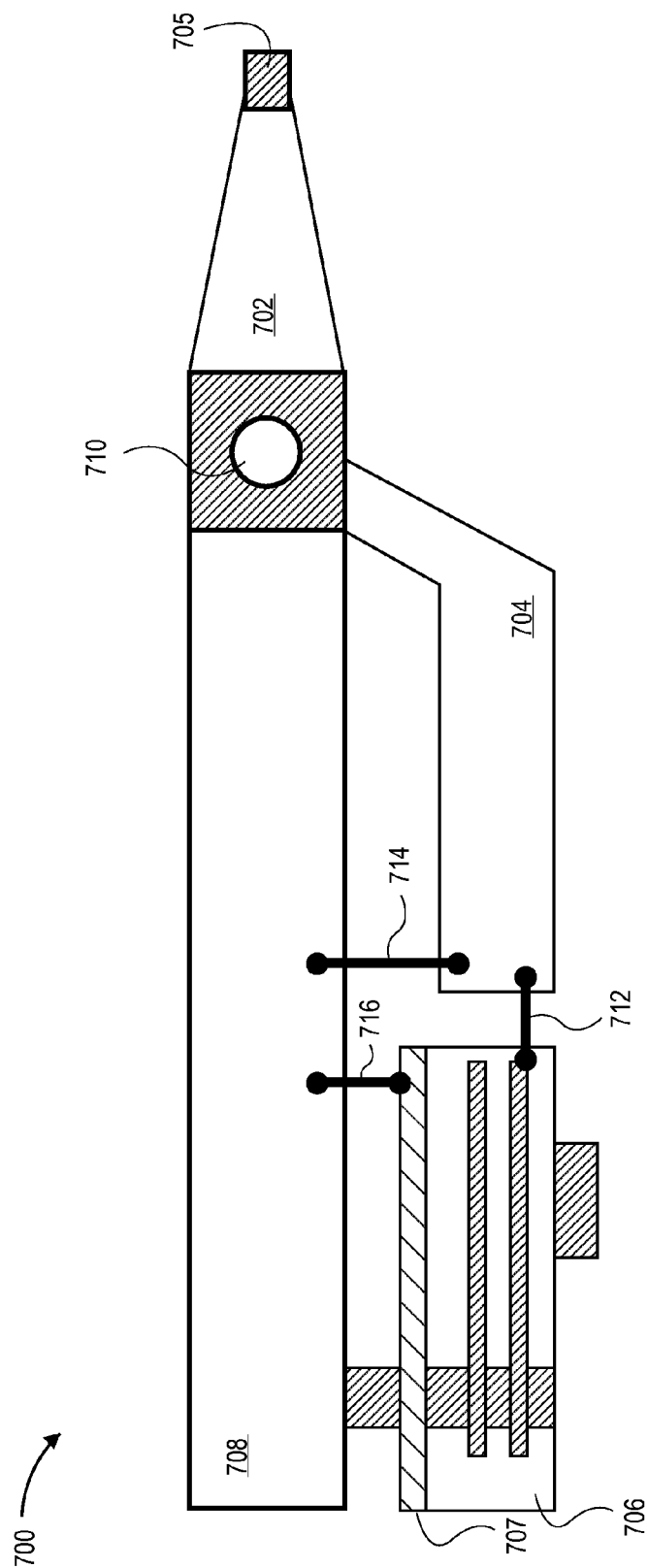
FIG. 7 is a diagram illustrating a grounding configuration of an HSA, according to an embodiment of the invention.

FIG. 7 is a diagram illustrating a grounding configuration of an HSA, according to an embodiment of the invention. The embodiment depicted in FIG. 7 illustrates that previously described embodiments may be combined, although such combinations are not limited to that depicted in FIG. 7. HSA 700 comprises a suspension 702 coupled with a head 705 and having a suspension tail 704, coupled with an arm 708 by way of a swage 710. An electrically conductive path 712 between the suspension tail 704 and the FCA 706 is provided, such as with embodiments described in reference to FIG. 3. Further, an electrically conductive path 714 between the suspension tail 704 and the arm 708 is provided, such as by using a conductive adhesive between the arm 708 and the suspension tail 704. According to an embodiment, the position of the conductive adhesive electrically connecting the arm 708 and the suspension tail 704 is at the suspension tail tip (see, e.g., tail tip 305 of FIG. 3). Additionally, HSA 700 comprises an electrical connection 716 connecting the stiffener layer 707 of FCA 706 to the arm 708, thereby strengthening the electrical relationship between the metal stiffener and the arm 708. According to an embodiment, the electrical connection 716 comprises a screw connecting the stiffener layer 707 to the arm 708.

Figure 8:
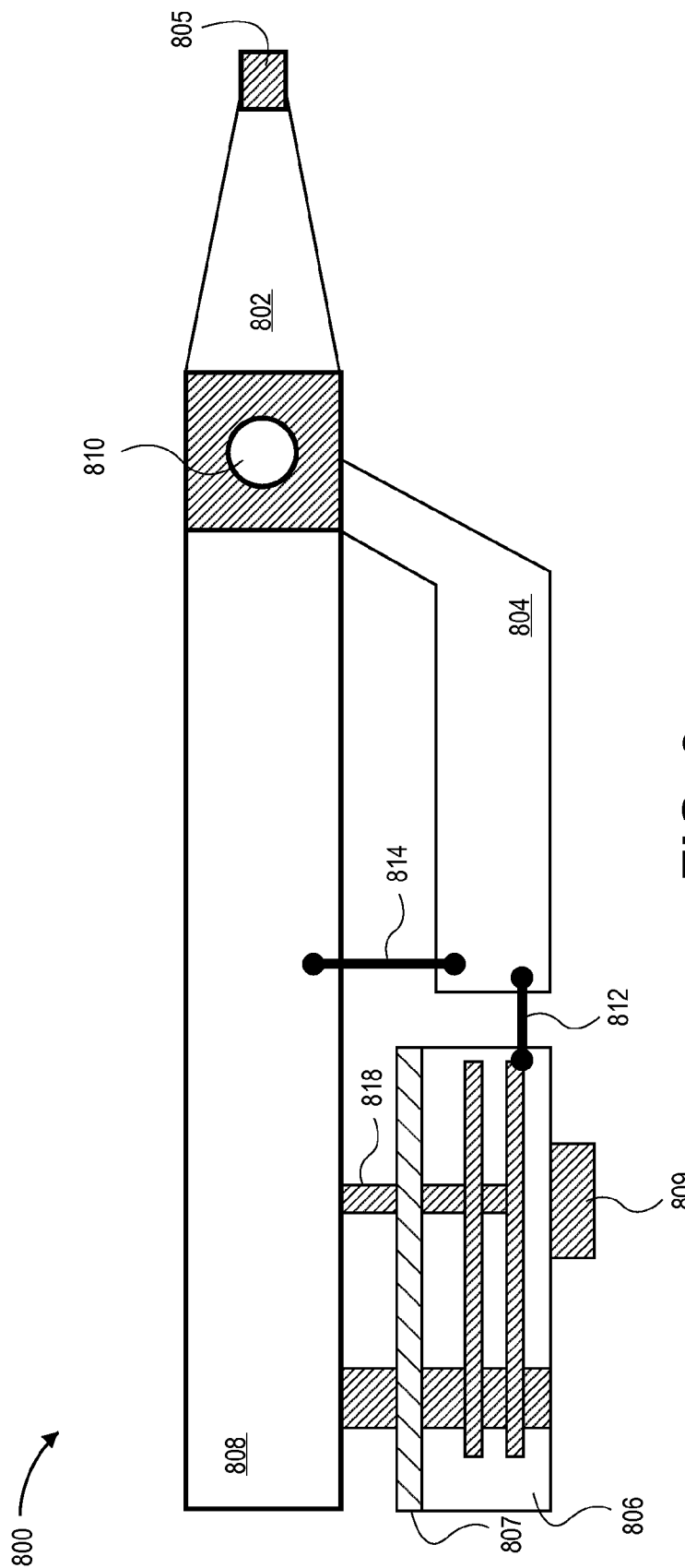
FIG. 8 is a diagram illustrating a grounding configuration of an HSA, according to an embodiment of the invention.

FIG. 8 is a diagram illustrating a grounding configuration of an HSA, according to an embodiment of the invention. HSA 800 comprises a suspension 802 coupled with a head 805 and having a suspension tail 804, coupled with an arm 808 by way of a swage 810. An electrically conductive path 812 between the suspension tail 804 and the FCA 806 is provided, such as with embodiments described in reference to FIG. 3. Further, an electrically conductive path 814 between the suspension tail 804 and the arm 808 is provided, such as by using a conductive adhesive between the arm 808 and the suspension tail 804. According to an embodiment, the position of the conductive adhesive electrically connecting the arm 808 and the suspension tail 804 is at the suspension tail tip (see, e.g., tail tip 305 of FIG. 3). Additionally, HSA 800 comprises an electrical connection 818 connecting the stiffener layer 807 and the GND pattern (see, e.g., GND trace 206, via 216, and trace 212 as a GND trace, of FIG. 2A) of FCA 806 to the arm 808, thereby lowering the electrical resistance (or impedance) between the GND pattern of FCA 806 and the arm 808.

According to an embodiment, the electrical connection 818 comprises a screw connecting the stiffener layer 807 and the GND pattern of FCA 806 to the arm 808. FIG. 8 depicts the configuration of HSA 800 as having the electrical connection 818 positioned close to the preamp 809 on the FCA 806, according to an embodiment, thereby quieting the electrical ground in the vicinity of the preamp 809, which receives the read signals coming from the head 805. According to another embodiment, the electrical connection 818 comprises a low-resistance material sandwiched between the stiffener layer 807, and thus the GND pattern of FCA 806, and the arm 808.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A flexible cable assembly (FCA) comprising:
   one or more layer of electrically conductive leads, wherein at least one lead constitutes an electrical ground;
   a respective insulation layer adjacent to each of said one or more layer of leads; and
   a stiffener layer adjacent to at least one of said respective insulation layer, said stiffener layer comprising a ground post protruding from said stiffener layer through said at least one respective insulation layer and positioned in electrical contact with said electrical ground.

2. The flexible cable assembly of claim 1, wherein said ground post is positioned in physical contact with said electrical ground.

3. The flexible cable assembly of claim 1, wherein said ground post terminates in contact with said electrical ground while not protruding through said electrical ground.

4. The flexible cable assembly of claim 1, wherein said stiffener layer is formed of aluminum.

5. A head stack assembly (HSA) for a hard disk drive, said HSA comprising:
   a flexible cable assembly (FCA) comprising,
      one or more layer of electrically conductive leads, wherein at least one lead is configured as an electrical ground,
      a respective insulation layer adjacent to each of said one or more layer of leads, and
      a stiffener layer adjacent to at least one of said respective insulation layer, said stiffener layer comprising a ground post protruding from said stiffener layer through said at least one respective insulation layer and positioned in electrical contact with said electrical ground; and
   a suspension comprising,
      a suspension tail comprising one or more traces electrically connecting a read/write head to said stiffener layer of said FCA.

6. The head stack assembly of claim 5, wherein said one or more traces comprises an electrical ground trace, and wherein physical contact between said suspension tail and said stiffener layer provides a ground path between said read/write head and said FCA.

7. The head stack assembly of claim 6, wherein said stiffener layer is formed of aluminum and said suspension tail comprises stainless steel, and wherein said physical contact between said suspension tail stainless steel and said stiffener layer aluminum is generated by solder connections electrically connecting solder pads of said suspension tail to solder pads of said stiffener layer.

8. The head stack assembly of claim 5, further comprising:
   an actuator arm with which said suspension is coupled;
   wherein said suspension tail is directly electrically connected to said arm via a conductive adhesive.

9. The head stack assembly of claim 8, further comprising:
   a conductive screw directly electrically connecting said stiffener layer to said arm.

10. The head stack assembly of claim 8, further comprising:
    a conductive ground post directly electrically connecting said electrical ground and said stiffener layer of said FCA to said arm.

11. A hard disk drive, comprising:
    a disk media rotatably mounted on a spindle;
    a head stack assembly (HSA) comprising,
       a flexible cable assembly (FCA) comprising,
          one or more layers of electrically conductive leads, wherein at least one lead is configured as an electrical ground,
          a respective insulation layer adjacent to each of said one or more layers of leads, and
          a stiffener layer adjacent to at least one of said insulation layer, said stiffener layer providing an electrically conductive path to said electrical ground;
       a suspension comprising,
          a suspension tail comprising one or more traces electrically connecting a read/write head to said stiffener layer of said FCA; and
    a voice coil actuator configured to move said suspension and said read/write head to access portions of the disk media.

12. The hard disk drive of claim 11, wherein said one or more traces comprises an electrical ground trace, and wherein physical contact between said suspension tail and said stiffener layer provides a ground path between said read/write head and said FCA.

13. The hard disk drive of claim 12, wherein said stiffener layer is formed of aluminum and said suspension tail comprises stainless steel, and wherein said physical contact between said suspension tail stainless steel and said stiffener layer aluminum is generated by solder connections electrically connecting solder pads of said suspension tail to solder pads of said stiffener layer.

14. The hard disk drive of claim 11, wherein said stiffener layer comprises a ground post protruding from said stiffener layer through said at least one insulation layer and positioned in electrical contact with said electrical ground.

15. The hard disk drive of claim 14, wherein said ground post is positioned in physical contact with said electrical ground.

16. The hard disk drive of claim 11, further comprising:
    a low-resistance material sandwiched between said stiffener layer and said electrical ground, providing said electrically conductive path to said electrical ground.

17. The hard disk drive of claim 16, wherein said low-resistance material comprises an electrically conductive oil.

18. The hard disk drive of claim 16, wherein said low-resistance material comprises solder.

19. The hard disk drive of claim 11, said HSA further comprising:
    an actuator arm with which said suspension is coupled;
    wherein said suspension tail is directly electrically connected to said arm via a conductive adhesive.

20. The hard disk drive of claim 19, further comprising:
    a conductive screw directly electrically connecting said stiffener layer to said arm.

21. The hard disk drive of claim 19, further comprising:
    a conductive ground post directly electrically connecting said electrical ground and said stiffener layer of said FCA to said arm.

* * * * *